(12) United States Patent
Goteti et al.

(10) Patent No.: US 11,448,788 B2
(45) Date of Patent: Sep. 20, 2022

(54) GENERATING ENHANCED SEISMIC VELOCITY MODELS USING GEOMECHANICAL MODELING

(71) Applicant: Saudi Arabian Oil Company, Dhahran (SA)

(72) Inventors: Rajesh Goteti, Katy, TX (US); Hyoungsu Baek, Houston, TX (US); John P. Brown, Dhahran (SA); Joao V. Keller, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/931,885

(22) Filed: Jul. 17, 2020

(65) Prior Publication Data

US 2021/0018638 A1 Jan. 21, 2021

Related U.S. Application Data

(60) Provisional application No. 62/876,322, filed on Jul. 19, 2019.

(51) Int. Cl.
*G01V 1/30* (2006.01)
*G01V 1/28* (2006.01)

(52) U.S. Cl.
CPC ............ *G01V 1/303* (2013.01); *G01V 1/282* (2013.01); *G01V 1/301* (2013.01); *G01V 2210/642* (2013.01); *G01V 2210/643* (2013.01)

(58) Field of Classification Search
CPC ........ G01V 1/303; G01V 1/282; G01V 1/301; G01V 2210/642; G01V 2210/643

USPC ........................................................ 702/16
See application file for complete search history.

(56) References Cited

U.S. PATENT DOCUMENTS

| | | | |
|---|---|---|---|
| 9,310,500 B2 | 4/2016 | Kacewicz et al. | |
| 2004/0073370 A1* | 4/2004 | Dasgupta | G01V 1/42 |
| | | | 702/6 |
| 2009/0303834 A1* | 12/2009 | Sengupta | G01V 1/303 |
| | | | 367/73 |

(Continued)

FOREIGN PATENT DOCUMENTS

WO 2017/035104 3/2017

OTHER PUBLICATIONS

Bachrach et al., "Using geomechanical modeling and wide-azimuth data to quantify stress effects and anisotropy near salt bodies in the Gulf of Mexico." In SEG Technical Program Expanded Abstracts 2008, Society of Exploration Geophysicists, 2008, 212-216, 5 pages.

(Continued)

*Primary Examiner* — Michael P Nghiem
(74) *Attorney, Agent, or Firm* — Fish & Richardson P.C.

(57) ABSTRACT

Enhanced seismic velocity models are generated using a geomechanical model. A tomographic velocity model is generated based on raw seismic data. One or more initial seismic images are generated based at least partially on the tomographic velocity model. Geomechanical data and the initial seismic images are used to generate a geomechanical model. The geomechanical model produces geomechanical outputs that are used to generate a geomechanical velocity model. A second tomographic velocity model is generated based on the first tomographic velocity model and the geomechanical velocity model.

21 Claims, 5 Drawing Sheets

(56) References Cited

U.S. PATENT DOCUMENTS

| | | | |
|---|---|---|---|
| 2013/0238304 A1* | 9/2013 | Glinsky | G01V 99/005 |
| | | | 703/6 |
| 2014/0233352 A1* | 8/2014 | Kacewicz | G01V 1/303 |
| | | | 367/73 |
| 2016/0202374 A1 | 7/2016 | Kainkaryam et al. | |
| 2016/0320512 A1* | 11/2016 | Zhao | G01V 1/362 |
| 2017/0075007 A1* | 3/2017 | Walters | G01V 1/42 |
| 2017/0177764 A1* | 6/2017 | Guy | E21B 49/00 |
| 2017/0285193 A1 | 10/2017 | Zhang et al. | |
| 2018/0067220 A1 | 3/2018 | Flemings et al. | |
| 2020/0333489 A1* | 10/2020 | Al-Ali | G01V 1/282 |

OTHER PUBLICATIONS

Heidari et al., "Coupling geomechanical modeling with seismic pressure prediction." Geophysics 83, No. 5, 2018, 54 pages.

Nikolinakou et al., "Pore-pressure prediction based on seismic velocities coupled with geomechanical modeling." In 50th US Rock Mechanics/Geomechanics Symposium. American Rock Mechanics Association, 2016, 8 pages.

Sengupta et al., "Relationship between velocity and anisotropy perturbations and anomalous stress field around salt bodies." The Leading Edge 28, No. 5 (2009), 598-605, 7 pages.

Zee et al., "3D geomechanical modeling of complex salt structures." In SIMULIA Customer Conference. 2011, 16 pages.

PCT International Search and Written Opinion in International Application No. PCT/US2020/042,480, dated Oct. 26, 2020, 15 pages.

GCC Examination Report issued in Gulf Cooperation Council Appln. No. 202040123, dated Sep. 20, 2021, 3 pages.

\* cited by examiner

GENERATING ENHANCED SEISMIC VELOCITY MODELS USING GEOMECHANICAL MODELING

CLAIM OF PRIORITY

This application claims priority to U.S. Provisional Application Ser. No. 62/876,322, filed on Jul. 19, 2019, the entire contents of which is incorporated herein by reference.

TECHNICAL FIELD

The present disclosure generally relates to generating seismic velocity models.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features for applications, for example, identification of potential petroleum reservoirs. Seismic surveys are conducted by using a controlled seismic source (for example, Vibroseis™ or dynamite) to create a seismic wave. The seismic source is typically located at ground surface. The seismic wave travels into the ground, is reflected by subsurface formations, and returns to the surface where it is recorded by sensors called geophones. The geologists and geophysicists analyze the time it takes for the seismic waves to reflect off subsurface formations and return to the surface to map sedimentary facies and other geologic features. This analysis can also incorporate data from sources, for example, borehole logging, gravity surveys, and magnetic surveys.

One approach to this analysis is based on tracing and correlating along continuous reflectors throughout the dataset produced by the seismic survey to produce structural maps that reflect the spatial variation in depth of certain facies. These maps can be used to identify impermeable layers and faults that can trap hydrocarbons such as oil and gas. In some instances, tracing can involve the process of migration (for example, imaging), which involves the repositioning of seismic data so that a more accurate picture of subsurface reflectors is given. Performing migration calculations can include determining/approximating the seismic velocities in the subsurface at a multitude of points.

SUMMARY

This specification describes systems and methods in which a dynamic geomechanical forward model is used to enhance seismic velocity models when compared to traditional techniques for seismic velocity modeling. Raw seismic data is used to generate an initial tomographic velocity model. The geomechanical model is used to simulate the tectonic evolution of geological structures. Results from the geomechanical model simulations are used to gain a better understanding of the impact that the mechanical evolution of sediments and salt have on the spatial variability of sediment densities and pore-pressures. These results are used to generate a geomechanical velocity model. A second tomographic velocity model is generated using the initial tomographic velocity model and the geomechanical velocity model.

In at least one aspect of the present disclosure, a method is provided. The method includes generating a first tomographic velocity model based on received raw seismic data. The method includes generating one or more initial seismic images based at least partially on the first tomographic velocity model. The method includes generating a geomechanical model based at least partially on received geomechanical data and the one or more initial seismic images. The method includes generating a plurality of geomechanical outputs by performing one or more geomechanical simulations using the geomechanical model. The method includes generating a geomechanical velocity model based at least partially on the geomechanical outputs. The method includes generating a second tomographic velocity model based at least partially on the first tomographic velocity model and the geomechanical velocity model.

The method can further include generating one or more updated seismic images based at least partially on the second tomographic velocity model. Generating one or more initial seismic images can include performing reverse time migration. Generating one or more initial seismic images can include performing Kirchoff migration. Generating a second tomographic velocity model can include warping the geomechanical velocity model to the first tomographic velocity model.

Generating a first tomographic velocity model can include determining one or more interval velocities. The received geomechanical data can include evolutionary tectonic data.

The geomechanical model can be a dynamic forward geomechanical model. The geomechanical outputs can include at least one of: an effective mean stress value, an effective stress value, a density value, or a bulk modulus value.

In at least one other aspect of the present disclosure, a system is provided. The system includes a raw seismic data module configured to obtain raw seismic data. The system includes tomographic velocity modeling module configured to receive the raw seismic data and generate a first tomographic velocity model based on received raw seismic data. The system includes a seismic imaging module configured to generate one or more initial seismic images based at least partially on the first tomographic velocity model. The system includes a geomechanical modeling module. The geomechanical modeling module is configured to generate a geomechanical model based at least partially on received geomechanical data and the one or more initial seismic images, and generate a plurality of geomechanical outputs by performing one or more geomechanical simulations using the geomechanical model. The system includes a geomechanical velocity modeling module configured to generate a geomechanical velocity model based at least partially on the geomechanical outputs. The tomographic velocity modeling module is further configured to generate a second tomographic velocity model based at least partially on the first tomographic velocity model and the geomechanical velocity model.

The seismic imaging module can be further configured to generate one or more updated seismic images based at least partially on the second tomographic velocity model. The seismic imaging model can be configured to perform reverse time migration to generate the one or more initial seismic images comprises performing reverse time migration. The seismic imaging model can be configured to perform Kirchhoff migration to generate the one or more initial seismic images. The tomographic velocity modeling module can be further configured to determine one or more interval velocities to generate the first tomographic velocity model. The velocities are typically in units of meters/second (m/s).

The geomechanical model can be a dynamic forward geomechanical model. The geomechanical outputs can be at least one of: an effective mean stress value, an effective stress value, a density value, or a bulk modulus value.

The tomographic velocity modeling module can be further configured to warp the geomechanical velocity model to the first tomographic velocity model to generate the second tomographic velocity model.

In at least one aspect of the present disclosure, one or more non-transitory computer readable media are provided. The one or more non-transitory computer readable media are store instructions configured, when executed by at least one processing device, the at least one processing device to perform operations that include generating a first tomographic velocity model based on received raw seismic data. The operations include generating one or more initial seismic images based at least partially on the first tomographic velocity model. The operations include generating a geomechanical model based at least partially on received geomechanical data and the one or more initial seismic images. The operations include generating a plurality of geomechanical outputs by performing one or more geomechanical simulations using the geomechanical model. The operations include generating a geomechanical velocity model based at least partially on the geomechanical outputs. The operations include generating a second tomographic velocity model based at least partially on the first tomographic velocity model and the geomechanical velocity model.

The operations can further include generating one or more updated seismic images based at least partially on the second tomographic velocity model. Generating one or more initial seismic images can include performing reverse time migration. Generating one or more initial seismic images can include performing Kirchoff migration. Generating a second tomographic velocity model can include warping the geomechanical velocity model to the first tomographic velocity model.

Generating a first tomographic velocity model can include determining one or more interval velocities. The received geomechanical data can include evolutionary tectonic data.

The geomechanical model can be a dynamic forward geomechanical model. The geomechanical outputs can include at least one of: an effective mean stress value, an effective stress value, a density value, or a bulk modulus value.

Embodiments of these systems and methods can include one or more of the following advantages. The present disclosure provides means for generating velocity models for use in subsurface imaging. The described systems and methods for producing velocity models support the mapping of lateral variations in seismic velocities as a function of lateral positions with respect to key geological structures such as salt diapers, salt walls or canopies, as well as a function of depth. In contrast, conventional methods of generating velocity models predominantly employ the usage of depth as a key parameter when calibrating seismic velocity across a region of interest. This approach ignores lateral variations in seismic velocities arising from anomalous compaction and pore-pressure variations in the sediments near salt bodies.

The systems and methods described in this specification use dynamic geomechanical forward model to simulate the tectonic evolution of geological structures near or beneath salt structures proximate to sedimentary layers. The results of the geomechanical model simulations are used to constrain recorded seismic velocities based on the impact of the mechanical evolution of sediments and salt on the spatial variability of the sediment densities and pore-pressures. Using a dynamic geomechanical model, as opposed to a static geomechanical model, allows these systems and methods to account for anomalous dilation or compaction of an area of interest, both of which are related to geological history. The incorporation of geological history using the dynamic geomechanical model can be especially important when sediment deposition and salt deformation are coeval (for example, having the same age or date of origin), in which case enhanced compaction or dilation near salt bodies probably results in anomalous seismic velocities. This approach allows for more efficient well planning, especially near salt bodies. Consequently, relative to traditional techniques for velocity modeling for subsurface imaging, these systems and methods can reduce errors when estimating the location of interpreted reservoirs and can provide greater accuracy when imaging subsurface layers in a region of interest.

The details of one or more embodiments of these systems and methods are set forth in the accompanying drawings and the following description. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

This specification describes systems and methods in which a dynamic geomechanical forward model is used to enhance seismic velocity models when compared to traditional techniques for seismic velocity modeling. Raw seismic data is used to generate an initial tomographic velocity model. The geomechanical model is used to simulate the tectonic evolution of geological structures. Results from the geomechanical model simulations are used to gain a better understanding of the impact that the mechanical evolution of sediments and salt have on the spatial variability of sediment densities and pore-pressures. These results are used to generate a geomechanical velocity model. A second tomographic velocity model is generated.

Figure 1:
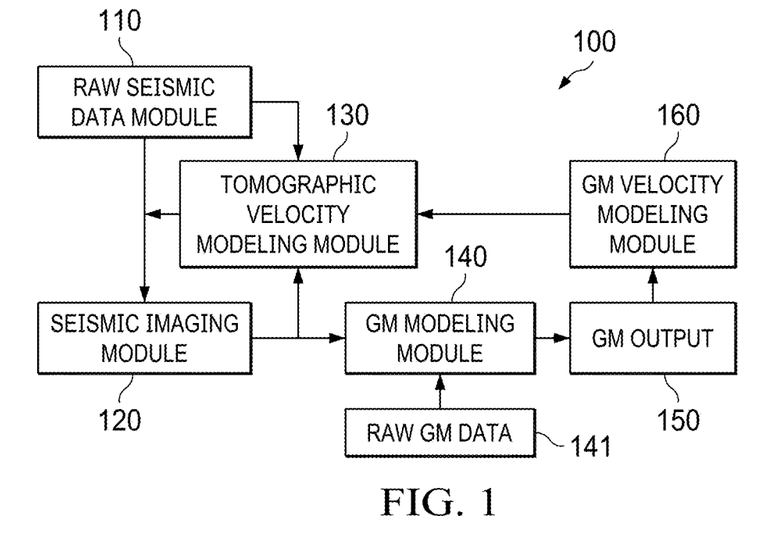
FIG. 1 illustrates an architecture of a system for generating enhanced velocity models using geomechanical modeling.

FIG. 1 illustrates an architecture 100 of a system for generating enhanced velocity models using geomechanical modeling. The architecture 100 includes a raw seismic data module 110, a seismic imaging module 120, a tomographic velocity modeling module 130, a geomechanical modeling module 140 and a geomechanical velocity modeling module 160.

Figure 2:
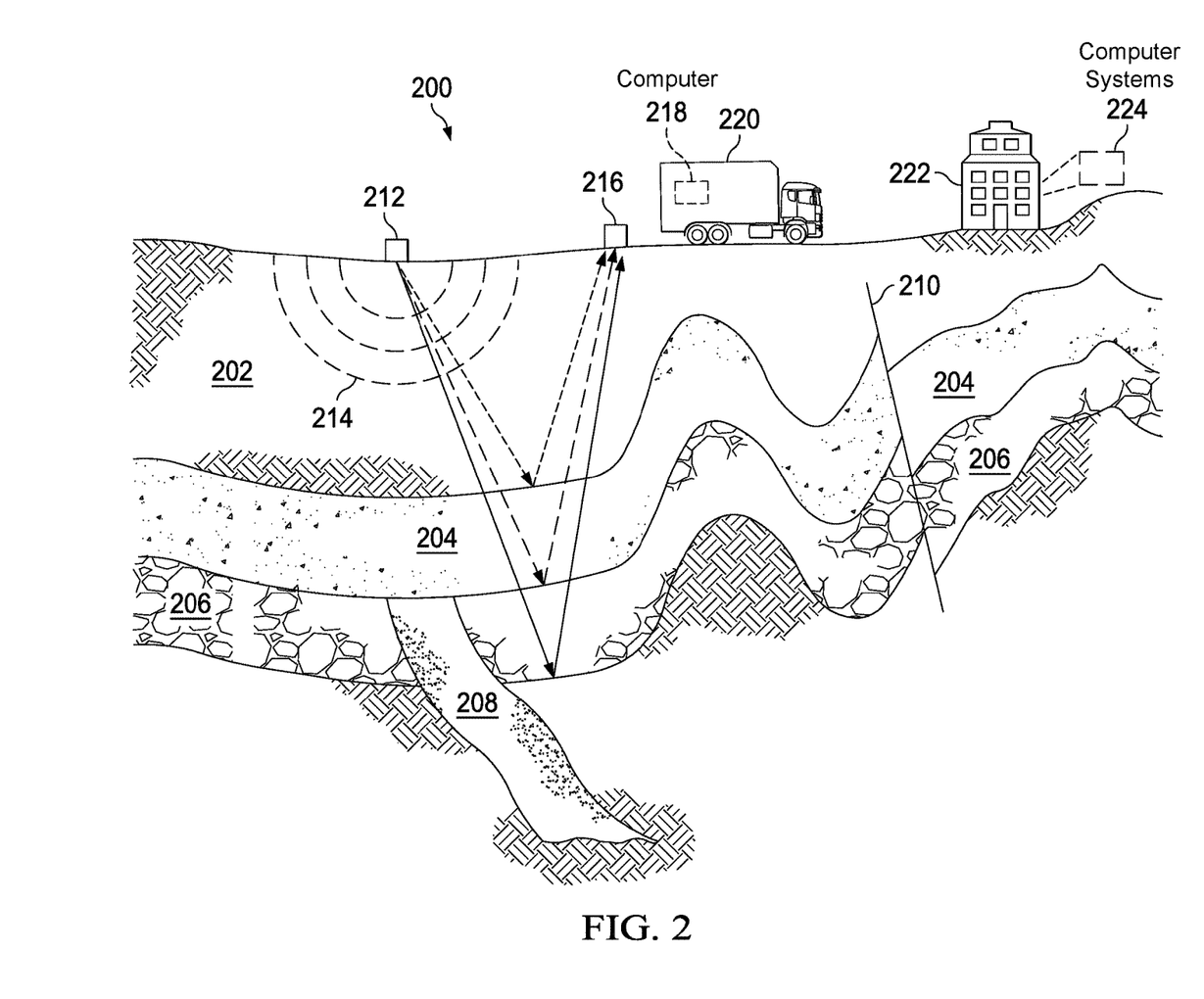
FIG. 2 is a schematic view of a seismic survey being performed to map subterranean features such as facies and faults.

The raw seismic data module 110 includes program elements to store and organize the results of one or more seismic surveys to collect raw seismic data of a region of interest to be used for seismic velocity modeling and imaging of the region of interest. For example, FIG. 2 is a schematic view of a seismic survey being performed to map subterranean features such as facies and faults in a subterranean formation 200. The seismic survey can be performed in conjunction with the raw seismic data module 110 of FIG. 1. The subterranean formation 200 includes a layer of impermeable cap rocks 202 at the surface. Facies underlying the impermeable cap rocks 202 include a sandstone layer 204, a limestone layer 206, and a sand layer 208. A fault line 210 extends across the sandstone layer 204 and the limestone layer 206.

A seismic source 212 (for example, a seismic vibrator or an explosion) generates seismic waves 214 that propagate in the earth. The velocity of these seismic waves depends on properties, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 200, the velocity of seismic waves traveling through the subterranean formation 200 will be different in the sandstone layer 204, the limestone layer 206, and the sand layer 208. As the seismic waves 214 contact interfaces between geologic bodies or layers that have different velocities, the interface reflects some of the energy of the seismic wave and refracts part of the energy of the seismic wave. Such interfaces are sometimes referred to as horizons.

The seismic waves 214 are received by a sensor or sensors 216. Although illustrated as a single component, the sensor or sensors 216 are typically a line or an array of sensors 216 that generate an output signal in response to received seismic waves including waves reflected by the horizons in the subterranean formation 200. The sensors 216 can be geophone-receivers that produce electrical output signals transmitted as input data, for example, to a computer 218 on a seismic control truck 220. Based on the input data, the computer 218 may generate a seismic data output, for example, a seismic two-way response time plot.

A control center 222 can be operatively coupled to the seismic control truck 220 and other data acquisition and wellsite systems. The control center 222 may have computer facilities for receiving, storing, processing, and analyzing data from the seismic control truck 220 and other data acquisition and wellsite systems. For example, computer systems 224 in the control center 222 can be configured to analyze, model, control, optimize, or perform management tasks of field operations associated with development and production of resources such as oil and gas from the subterranean formation 200. Alternatively, the computer systems 224 can be located in a different location than the control center 222. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer system 224 may be displayed for user viewing using local or remote monitors or other display units. One approach to analyzing seismic data is to associate the data with portions of a seismic cube representing represent the subterranean formation 200. The seismic cube can also be display results of the analysis of the seismic data associated with the seismic survey.

Referring back to FIG. 1, additionally or alternatively, the raw seismic data module 110 includes means for obtaining existing seismic data. In some implementations, the raw seismic data module 110 includes one or more computer processors communicatively coupled to a database having seismic data store thereon. The tomographic velocity modeling module 130 receives the raw seismic data and generates, based on the raw seismic data, an initial tomographic velocity model $V_m(x,z)$ using velocity analysis where x is offset and z is depth. The raw seismic data includes data from one or more traces. A trace refers to a time series of reflections for one seismic source 212 at one sensor 216 location, for example. When performing velocity analysis, the velocity modeling module 110 estimates one or more migration velocities ($V_m$). The migration velocities are interval velocities ($V_{int}$), where each interval velocity corresponds to a subsurface layer. An interval velocity is the velocity of an interval in the subsurface and can be calculated using the root-mean-square velocity ($V_{RMS}$) and the Dix equation according to the following relationship: $V_{int} = [(t_2 V_{RMS2}^2 - t_1 V_{RMS1}^2)/(t_2 - t_1)]^{1/2}$ where $t_1$ is a travel time to a first reflector, $t_2$ is a travel time to a second reflector, $V_{RMS1}$ is the root-mean-square velocity to the first reflector, and $V_{RMS2}$ is the root-mean-square velocity to the second reflector. The root-mean-square velocity is the value of the square root of the sum of the squares of the velocity values divided by the number of values and reflects the velocity of an acoustic wave through subsurface layers of different interval velocities along a specific raypath. Thus, the initial velocity model includes a plurality of interval velocities representing a velocity spectrum.

Once the tomographic velocity modeling module 130 generates the initial velocity model, the seismic imaging module 120 migrates the estimated velocities of the initial velocity model. Migration refers to the process by which seismic events (for example, sensed reflections) are geometrically re-located in either space or time to the location in the subsurface that the event occurs. The seismic imaging module 120 migrates the velocities by performing reverse time migration on the velocity model. Performing reverse time migration includes determining numerical solutions to a complete wave-equation and typically does not have dip limitations. Using reverse time migration can allow the seismic imaging module 120 to handle complex waveform multipathing, including caustics and prismatic waves. In some implementations, the seismic imaging module 120 migrates the velocities by performing Kirchhoff migration. Kirchhoff migration refers to a method of migration that uses the integral form (Kirchhoff equation) of the wave equation. During Kirchhoff migration, backpropagation is done by using the Kirchhoff integral representation of a field at a given point as a weighted superposition of waves propagating from adjacent points and times. Performing migration on the initial velocity model allows the seismic imaging module 120 to generate one or more initial images of the subsurface based on the migrated velocities. The migration also allows the seismic imaging module 120 to generate one or more image gathers. An image gather refers to a gather of traces from various offsets or angles, adjusted for travel time differences from zero offset, in time or depth.

The initial images generated by the seismic imaging module 120 are sent to the geomechanical (GM) modeling module 140. The GM modeling module 140 also receives, from available data sources, raw GM data 141 associated with the region of interest. The raw GM data 141 includes values of material geological properties assigned for various geological layers of the region of interest. The values are obtained from known data and laboratory measurements. Generally, the GM modeling module 140 simulates the tectonic evolution of geological structures near or beneath, for example, salt structures based on the raw GM data 141 and the initial seismic images generated by the seismic imaging module 120.

For example, the GM modeling module 140 reproduces the likely loading, deposition, and resulting deformation of rocks during their geological evolution. First, the GM modeling module 140 defines the scale of the GM model based on the dimensions of the area of interest. Next, gravitational and thermal loading, with the latter being based on estimates of heat flow in the basins of the area of interest, are used to define loads that affect one or more rock layers in the simulation of the area of interest. In some implementations, other components of tectonic loading are also simulated based on the received seismic data. In some implementations, the GM modeling module 140 simulates prescribed displacements at the lateral boundaries of the area of interest, subsidence and evolution of tilt with respect to the basal surface of the area of interest, and sediment deposition. For example, displacements or velocities at all lateral and basal surfaces can be defined by the GM modeling module 140. In some implementations, water loading is simulated based on variations in water depth estimated from geological data. In some implementations, the effects of pore-pressure on the ambient deformation conditions are simulated.

The GM modeling module 140 reproduces the geological structure interpreted in the natural analogue from the initial seismic images generated by the seismic imaging module 120. The GM modeling module 140 is forward dynamic in that it simulates the evolution of a geological structure, which accounts for an initial geological state, geological loading (sediment deposition, gravity, thermal), up to a million-year time-scale, and large deformations that are typically interpreted from naturally deformed rocks. The evolution on the GM model's geometry is based on imposed conditions, material properties, sediment deposition, and underlying Newtonian physics of rock formation.

The initial simulations of the GM modeling module's 140 provide the dimensionality and general shape of key subsurface structures, such as salt diapers, salt walls, or canopies. The GM modeling module 140 then outputs, based on the simulated dimensionality and shapes, one or more GM outputs. GM outputs include effective stress, effective mean stress, bulk moduli (K), Poisson ratio (γ), and densities (ρ) at several target locations of the area of interest. The targeted locations can correspond to salt structures within the area of interest. Target locations can have intervals ranging from 10 meters to 500 meters between them depending on design considerations, accuracy considerations, and computational resources available. Effective stress refers to a force that keeps a collection of particles rigid. A bulk modulus of a location refers to a measure of how resistant to compression a substance is at the specific location of the area of interest. A density (mass per unit volume) of the formation at a location can describe a degree of compactness of the location. The GM modeling module 140 then uses the GM outputs to map the lateral variations in pore-pressures and densities of the region of interest at each determined location of the region of interest. In some implementations, the variations in pore-pressures and densities are mapped as a function of mean effective stress. Consequently, the GM modeling module 140 uses evolutionary tectonic data to provide insights into the relative magnitudes and directional trends of the effective stresses and degree of compaction at targeted locations of the area of interest as a function of structural position.

The determined pore-pressures and densities of each targeted location are received by the GM velocity modeling module 160. The GM velocity modeling module 160 determines, for each targeted location of the area of interest, a primary wave propagation velocity ($V_p$) and a secondary wave propagation velocity ($V_s$) based on the mapped variations in pore-pressures and densities to the targeted locations. A primary wave refers to a type of elastic wave that moves as a pressure wave such that the propagation of the wave is longitudinal. A secondary wave (or "S-wave") refers to a type of elastic wave that moves as a shear wave (or transverse wave) such that its motion is perpendicular to the direction of wave propagation. Assuming isotropic media, the relationship between the GM outputs and propagation velocities are as shown in Equations (1) and (2) that follow:

$$V_p = \sqrt{\frac{K + \frac{4}{3}\mu}{\rho}} \quad (1)$$

and $$V_s = \sqrt{\frac{\mu}{\rho}} \quad (2)$$

where μ represents the shear modulus defined by $$\mu = 3K \frac{1 - 2\gamma}{2 + 2\gamma}.$$

The primary and secondary wave propagation velocities for each targeted location are combined to generate a GM velocity model $V_g(x,z)$. The GM velocity modeling module 160 then warps the GM velocity model to the initial tomographic velocity model to obtain a warped GM velocity model $V'_g(x,z)$. In some implementations, the locations of salt boundaries are selected and used as feature points for warping. The warping relationship between the two velocity models is given by $(x',z')=(p(x,z), q(x,z))$, where $p(x,z)$ represents the abscissa and $q(x,z)$ represents the ordinate to the corresponding point to (x,z) after the mapping. The warped GM velocity model can therefore be defined as $V'_g(x,z)=V_g(p(x,z), q(x,z))$.

The tomographic velocity modeling module 130 receives the warped GM velocity model $V'_g(x,z)$ and uses the warped GM velocity model to obtain an updated tomographic velocity model $V'_m(x,z)$. The updated tomographic velocity model is migrated using at least one of the aforementioned migration techniques to obtain one or more updated seismic images and one or more updated image gathers. In some implementations, at least some portions of the aforementioned process is repeated to improve the quality of images and flatness of the image gathers. For example, the updated images can be used to update the GM model, which in turn can produce an updated GM velocity model. The updated GM velocity model can then be used to update the tomographic velocity model. This process can be repeated until a desired coherency, focus and flatness of the image is obtained.

Figure 3:
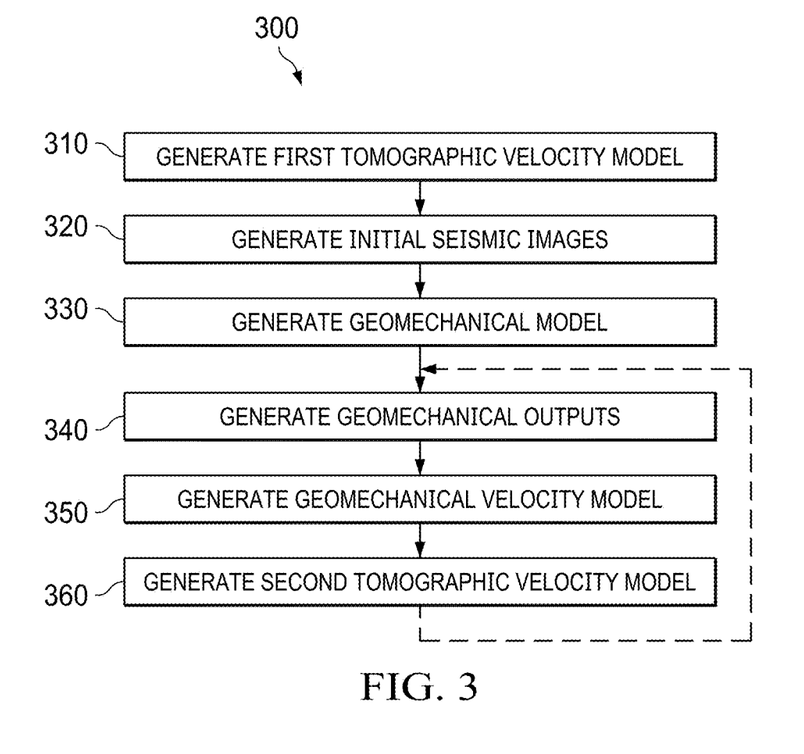
FIG. 3 is a flow diagram illustrating a method for generating enhanced velocity models using geomechanical modeling.

FIG. 3 is a flow diagram illustrating a method 300 for generating enhanced velocity models using geomechanical modeling. For illustrative purposes, the method 300 is described as being performed by the system 100 discussed previously with reference to FIG. 1. However, the method 300 can be performed by other systems configured to generate seismic images based on seismic data. The method 300 includes generating a first tomographic velocity model (block 310), generating initial seismic images (block 320), generating a GM model (block 330), generating GM outputs 150 (block 340), generating a GM velocity model (block 350), and generating a second tomographic velocity model (block 360).

At block 310, the velocity modeling module 110 estimates one or more interval velocities ($V_{int}$), where each interval velocity corresponds to a subsurface layer. An interval velocity is the velocity of an interval in the subsurface and can be calculated using the root-mean-square velocity ($V_{RMS}$) and the Dix equation. The root-mean-square velocity is the value of the square root of the sum of the squares of the velocity values divided by the number of values and reflects the velocity of an acoustic wave through subsurface layers of different interval velocities along a specific raypath. Thus, the initial velocity model includes a plurality of interval velocities representing a velocity spectrum.

At block 320 the seismic imaging module 120 migrates the estimated velocities of the initial velocity model. The seismic imaging module 120 migrates the velocities by performing reverse time migration on the velocity model. In some implementations, the seismic imaging module 120 migrates the velocities by performing Kirchhoff migration. Performing migration on the initial velocity model allows the seismic imaging module 120 to generate one or more initial images of the subsurface based on the migrated velocities. The migration also allows the seismic imaging module 120 to generate one or more image gathers.

At block 330, the initial images generated by the seismic imaging module 120 are sent to the GM modeling module 140. The GM modeling module 140 also receives, from available data sources, raw GM data 141 associated with the region of interest. Generally, the GM modeling module 140 simulates the tectonic evolution of geological structures near or beneath, for example, salt structures based on the raw GM data 141 and the initial seismic images generated by the seismic imaging module 120. The GM modeling module 140 reproduces the geological structure interpreted in the natural analogue from the initial seismic images generated by the seismic imaging module 120. The initial simulations of the GM modeling module's 140 indicate the dimensionality and general shape of key subsurface structures, such as salt diapirs, salt walls, or canopies.

At block 340, the GM modeling module 140 outputs, based on the simulated dimensionality and shapes, one or more GM outputs 150. GM outputs 150 include effective stress, bulk moduli and densities at several locations in the area of interest. The GM modeling module 140 then uses the GM outputs 150 to map the lateral variations in pore-pressures and densities of the region of interest at each determined location of the region of interest. In some implementations, the variations in pore-pressures and densities are mapped as a function of mean effective stress.

At block 350, the determined pore-pressures and densities of each determined location are received by the GM velocity modeling module 160. The GM velocity modeling module 160 determines, for each determined location of the area of interest, a primary and secondary wave propagation velocity based on the mapped variations in pore-pressures and densities to the determined locations. The primary and secondary wave propagation velocities for each determined location are combined to generate a GM velocity model $V_g(x,z)$. The GM velocity modeling module 160 then warps the GM velocity model to the initial tomographic velocity model to obtain a warped GM velocity model $V'_g(x,z)$. In some implementations, the locations of salt boundaries are selected and used as feature points for warping. The warping relationship between the two velocity models is given by $(x',z')=(p(x,z), q(x,z))$. The warped GM velocity model can therefore be defined as $V'_g(x,z)=V_g(p(x,z), q(x,z))$.

At block 360, the tomographic velocity modeling module 130 receives the warped GM velocity model $V'_g(x,z)$ and uses the warped GM velocity model to obtain a second tomographic velocity model $V'_m(x,z)$, which represents an updated version of the initial tomographic velocity model. The updated tomographic velocity model is migrated using at least one of the aforementioned migration techniques to obtain an updated one or more seismic images and one or more image gathers.

In some implementations, the method 300 includes repeating blocks 340-360 until a desired quality of images (such as, in terms of coherency and focus) and flatness of the image gathers is obtained.

Figure 4:
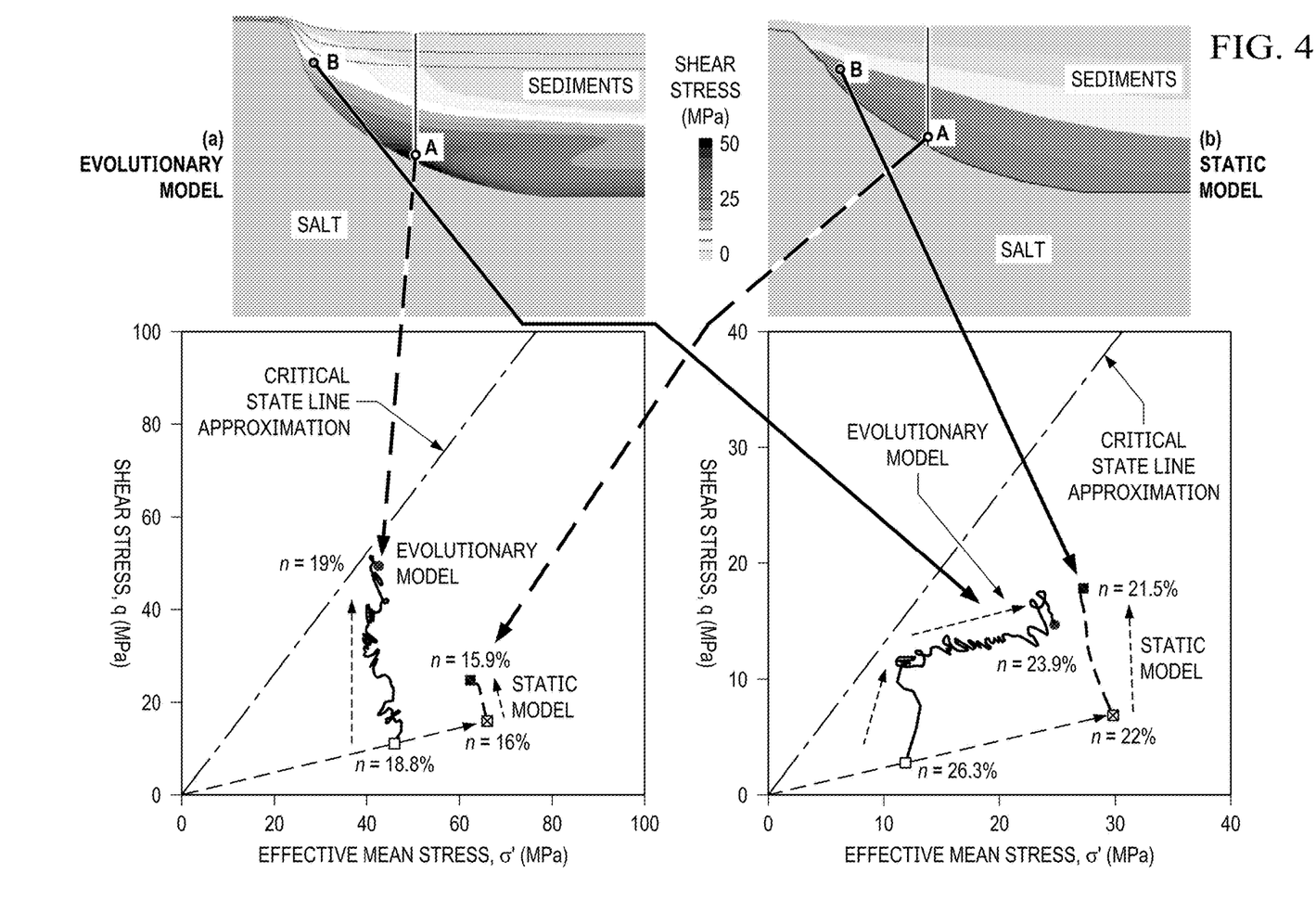
FIG. 4 is a chart illustrating the results of axis-symmetric finite element models from dynamic geomechanical models and static geomechanical models of sediment deformation near salt bodies.
Figure 5A:
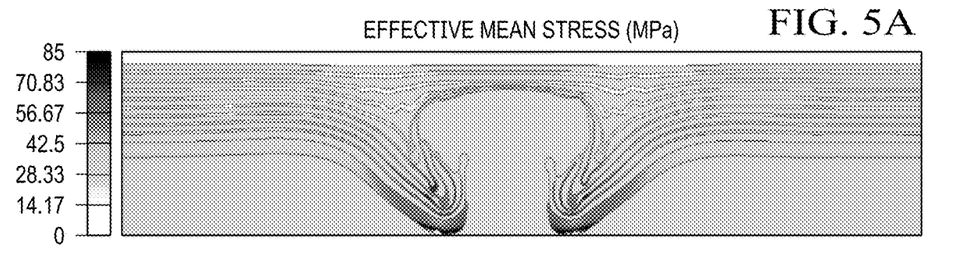
FIGS. 5A-5E illustrate several outputs from a geomechanical model and a resulting velocity migration model at locations near a salt body.
Figure 5B:
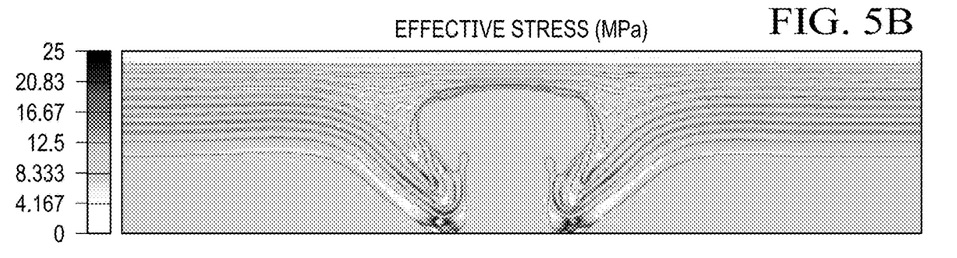
Figure 5C:
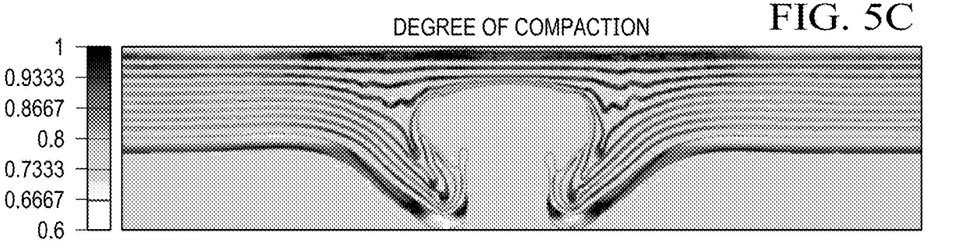
Figure 5D:
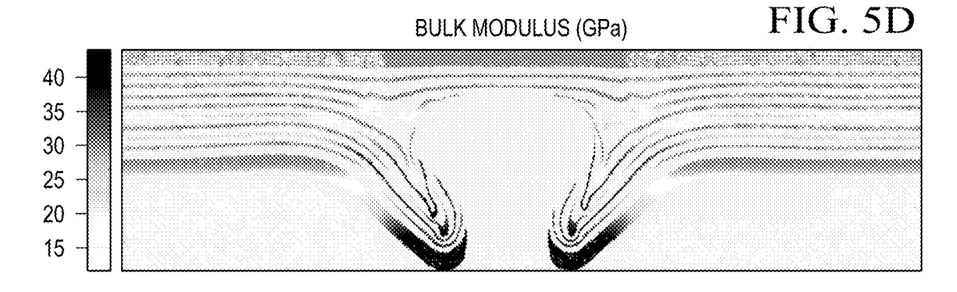
Figure 5E:
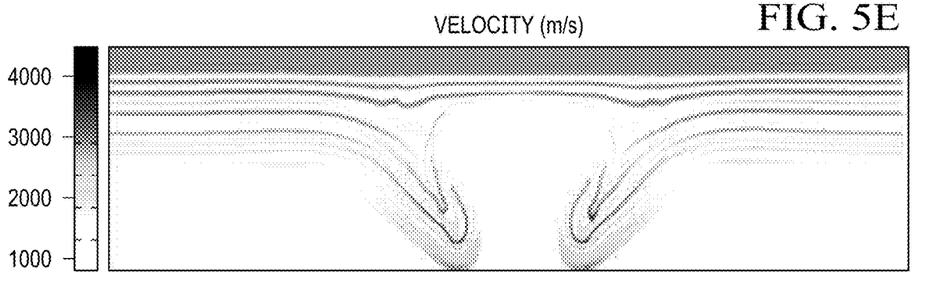

FIG. 4 is a chart illustrating the results of axis-symmetric finite element models from dynamic geomechanical models and static geomechanical models of sediment deformation near salt bodies. As shown, the evolution of the stress state in sediments in megapascal (MPa) adjacent to salt bodies is investigated at points "A" and "B". The results demonstrate that the dynamic model (or "evolutionary" model) captures the complexity of the stress history experiences by the sediments (for example, proximate to point "A") more fully than the static model. This additional detail allows the dynamic model to provide final in-situ stresses that are more reliable. This is particularly useful for accommodating effective stress, which controls the degree of compaction, and pore-pressures, both of which have a first-order impact on seismic velocities. The results also show that, for shallow sediments, the difference in the predicted stress state between static and dynamic models is reduced because shallow (or young) sediments have undergone relatively reduced degrees of geological deformation. The challenges related to imaging shallow sediments near salt bodies, such as near point "B", are relatively reduced compared to the deeper sediment layer geometries. Therefore, obtaining the likely degree of compaction in deeper sediments using dynamic geomechanical models can provide a better estimate of seismic velocities in sediments near salt structures when compared to static geomechanical models.

Figure 6:
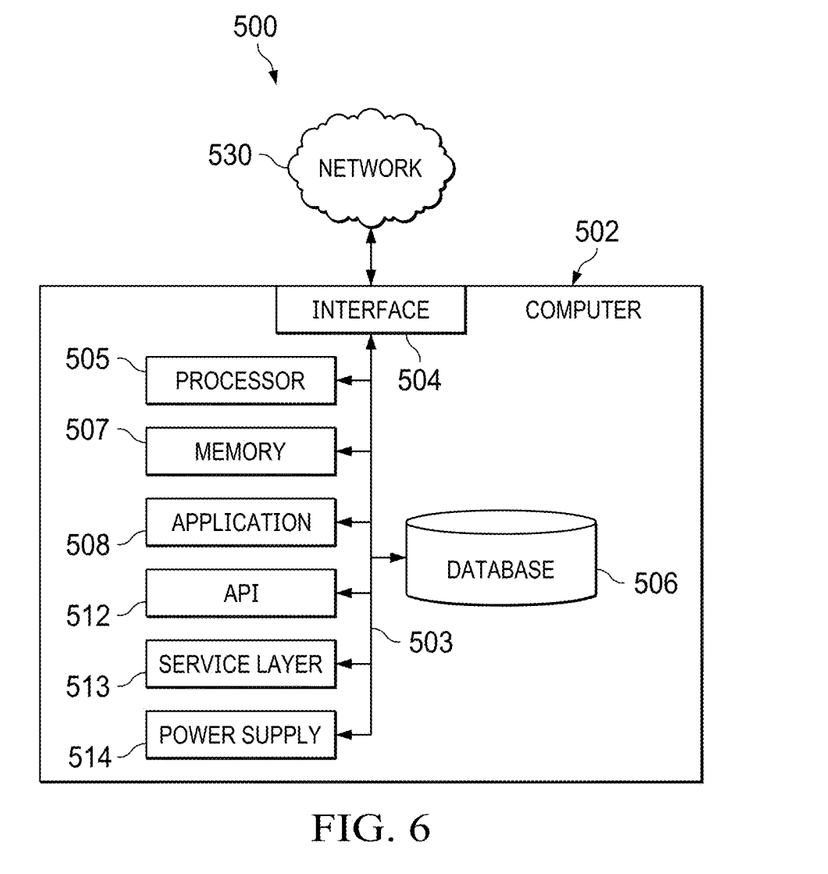
FIG. 6 is a block diagram of an example computer system used to provide computational functionalities associated with described algorithms, methods, functions, processes, flows, and procedures described in the present disclosure.

FIGS. 5A-5E illustrating several outputs from a geomechanical model and a resulting velocity migration model at locations near a salt body. As FIGS. 5A-5E show, the GM modeling module 140 outputs a mean effective stress, effective stress, degree of compaction (for example, density), and bulk modulus (in units of gigapascal (GPa)). The GM velocity modeling module 160 uses these outputs to generate a GM velocity model in a regular grid converted and interpolated using the shown bulk modulus and other material properties predicted by GM modeling. The high stress and degree of compaction is reflected in the high seismic velocity near the salt body FIG. 6 is a block diagram of an example computer system 500 used to provide computational functionalities associated with described algorithms, methods, functions, processes, flows, and procedures described in the present disclosure (such as the method 300 described previously with reference to FIG. 3), according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a high level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both), over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 6, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 6, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 6, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 6, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure.

What is claimed is:

1. A computer-implemented method, comprising:
generating a first tomographic velocity model based on received raw seismic data, the first tomographic velocity model specifying an interval velocity for each of a plurality of subsurface layers;
generating one or more initial seismic images based at least partially on the first tomographic velocity model;
generating a geomechanical model based at least partially on received geomechanical data and the one or more initial seismic images, the geomechanical model specifying, for each of the plurality of subsurface layers, gravitational loading and thermal loading values and corresponding displacements or velocities at lateral or basal surfaces of the subsurface layers;
generating a plurality of geomechanical outputs by performing one or more geomechanical simulations using the geomechanical model;
generating a geomechanical velocity model based at least partially on the geomechanical outputs including the gravitational loading and thermal loading values and corresponding displacements or velocities at lateral or basal surfaces of the subsurface layers, the geomechanical velocity model specifying a primary wave propagation velocity and a secondary wave propagation velocity for each of the plurality of subsurface layers; and
generating a second tomographic velocity model based at least partially on the first tomographic velocity model and the geomechanical velocity model, the second tomographic velocity model specifying an updated interval velocity for each of the plurality of subsurface layers based on the primary wave propagation velocity and the secondary wave propagation velocity for each of the plurality of subsurface layers.

2. The computer-implemented method of claim 1, further comprising generating one or more updated seismic images based at least partially on the second tomographic velocity model.

3. The computer-implemented method of claim 1, wherein generating one or more initial seismic images comprises performing reverse time migration.

4. The computer-implemented method of claim 1, wherein generating one or more initial seismic images comprises performing Kirchoff migration.

5. The computer-implemented method of claim 1, wherein the geomechanical model is a dynamic forward geomechanical model.

6. The computer-implemented method of claim 1, wherein the geomechanical outputs comprises at least one of: an effective mean stress value, an effective stress value, a density value, or a bulk modulus value.

7. The computer-implemented method of claim 1, wherein generating a second tomographic velocity model comprises warping the geomechanical velocity model to the first tomographic velocity model.

8. The computer-implemented method of claim 7, wherein warping the geomechanical velocity model to the first tomographic velocity model comprises:
identifying one or more boundaries between two or more subsurface layers of the plurality of subsurface layers;
selecting the one or more boundaries as feature points for warping the geomechanical velocity model.

9. The computer-implemented method of claim 1, wherein the received geomechanical data comprises evolutionary tectonic data.

10. The computer-implemented method of claim 1, wherein the corresponding displacements or velocities at lateral or basal surfaces of the subsurface layers comprises data indicative of lateral variations in pore-pressures and densities at one or more locations in each of the subsurface layers.

11. A system, comprising:
at least one processing device; and
a memory storing instructions that, when executed by the at least one processing device, cause the at least one processing device to:
obtain raw seismic data;
receive the raw seismic data and generate a first tomographic velocity model based on received raw seismic data, the first tomographic velocity model specifying an interval velocity for each of a plurality of subsurface layers;
generate one or more initial seismic images based at least partially on the first tomographic velocity model;
generate a geomechanical model based at least partially on received geomechanical data and the one or more initial seismic images, the geomechanical model specifying, for each of the plurality of subsurface layers, gravitational loading and thermal loading values and corresponding displacements or velocities at lateral or basal surfaces of the subsurface layers; and generate a plurality of geomechanical outputs by performing one or more geomechanical simulations using the geomechanical model;

generate a geomechanical velocity model based at least partially on the geomechanical outputs including the gravitational loading and thermal loading values and corresponding displacements or velocities at lateral or basal surfaces of the subsurface layers, the geomechanical velocity model specifying a primary wave propagation velocity and a secondary wave propagation velocity for each of the plurality of subsurface layers; and generate a second tomographic velocity model based at least partially on the first tomographic velocity model and the geomechanical velocity model, the second tomographic velocity model specifying an updated interval velocity for each of the plurality of subsurface layers based on the primary wave propagation velocity and the secondary wave propagation velocity for each of the plurality of subsurface layers.

12. The system of claim 11, wherein the seismic imaging module is further configured to generate one or more updated seismic images based at least partially on the second tomographic velocity model.

13. The system of claim 11, wherein the seismic imaging model is configured to perform reverse time migration to generate the one or more initial seismic images comprises performing reverse time migration.

14. The system of claim 11, wherein the seismic imaging model is configured to perform Kirchhoff migration to generate the one or more initial seismic images.

15. The system of claim 11, wherein the geomechanical model is a dynamic forward geomechanical model.

16. The system of claim 11, wherein the geomechanical outputs comprises at least one of: an effective mean stress value, an effective stress value, a density value, or a bulk modulus value.

17. The system of claim 11, wherein the tomographic velocity modeling module if further configured to warp the geomechanical velocity model to the first tomographic velocity model to generate the second tomographic velocity model.

18. One or more non-transitory computer readable media storing instructions that, when executed by at least one processing device, cause the at least one processing device to perform operations comprising:

generating a first tomographic velocity model based on received raw seismic data, the first tomographic velocity model specifying an interval velocity for each of a plurality of subsurface layers;

generating one or more initial seismic images based at least partially on the first tomographic velocity model;

generating a geomechanical model based at least partially on received geomechanical data and the one or more initial seismic images, the geomechanical model specifying, for each of the plurality of subsurface layers, gravitational loading and thermal loading values and corresponding displacements or velocities at lateral or basal surfaces of the subsurface layers;

generating a plurality of geomechanical outputs by performing one or more geomechanical simulations using the geomechanical model;

generating a geomechanical velocity model based at least partially on the geomechanical outputs including the gravitational loading and thermal loading values and corresponding displacements or velocities at lateral or basal surfaces of the subsurface layers, the geomechanical velocity model specifying a primary wave propagation velocity and a secondary wave propagation velocity for each of the plurality of subsurface layers; and generating a second tomographic velocity model based at least partially on the first tomographic velocity model and the geomechanical velocity model, the second tomographic velocity model specifying an updated interval velocity for each of the plurality of subsurface layers based on the primary wave propagation velocity and the secondary wave propagation velocity for each of the plurality of subsurface layers.

19. The one or more non-transitory computer readable media of claim 18, further comprising generating one or more updated seismic images based at least partially on the second tomographic velocity model.

20. The one or more non-transitory computer readable media of claim 18, wherein generating one or more initial seismic images comprises performing reverse time migration.

21. The one or more non-transitory computer readable media of claim 18, wherein generating one or more initial seismic images comprises performing Kirchoff migration.

* * * * *

UNITED STATES PATENT AND TRADEMARK OFFICE
CERTIFICATE OF CORRECTION

PATENT NO. : 11,448,788 B2
APPLICATION NO. : 16/931885
DATED : September 20, 2022
INVENTOR(S) : Goteti et al.

It is certified that error appears in the above-identified patent and that said Letters Patent is hereby corrected as shown below:

In the Claims

Column 18, Lines 4-11, Claim 1, delete "generating a second tomographic velocity model based at least partially on the first tomographic velocity model and the geomechanical velocity model, the second tomographic velocity model specifying an updated interval velocity for each of the plurality of subsurface layers based on the primary wave propagation velocity and the secondary wave propagation velocity for each of the plurality of subsurface layers." and insert -- generating a second tomographic velocity model based at least partially on the first tomographic velocity model and the geomechanical velocity model, the second tomographic velocity model being generated based on warping the geomechanical velocity model to the first tomographic velocity model, the second tomographic velocity model configured for generating one or more updated seismic images. --;

Column 18, Line 13, Claim 2, after "generating" insert -- the --;

Column 18, Line 21, Claim 4, delete "Kirchoff" and insert -- Kirchhoff --;

Column 18, Line 47, Claim 10, delete "locations in each" and insert -- locations in at least one --;

Column 19, Lines 21-24, Claim 11, delete "generating a second tomographic velocity model based at least partially on the first tomographic velocity model and the geomechanical velocity model, the second tomographic velocity model specifying an updated interval velocity for each of the plurality of subsurface layers based on the primary wave propagation velocity and the secondary wave propagation velocity for each of the plurality of subsurface layers." and insert -- generating a second tomographic velocity model based at least partially on the first tomographic velocity model and the geomechanical velocity model, the second tomographic velocity model being generated based on warping the geomechanical velocity model to the first tomographic velocity model, the second tomographic velocity model configured for generating one or more updated seismic images. --;

Signed and Sealed this
Twenty-third Day of May, 2023

*Katherine Kelly Vidal*
Katherine Kelly Vidal
*Director of the United States Patent and Trademark Office*

CERTIFICATE OF CORRECTION (continued)
U.S. Pat. No. 11,448,788 B2

Column 19, Lines 24-25, Claim 12, delete "wherein the seismic imaging module is further configured to generate one or more" and insert -- wherein the at least one processing device is further caused to generate the one or more --;

Column 19, Lines 28-29, Claim 13, delete "wherein the seismic imaging module is further configured to generate one or more" and insert -- wherein the at least one processing device is further caused to generate the one or more --;

Column 19, Lines 32-33, Claim 14, delete "wherein the seismic imaging module is further configured to generate one or more" and insert -- wherein the at least one processing device is further caused to generate the one or more --;

Column 19, Lines 41-42, Claim 17, delete "wherein the tomographic velocity modeling module if further configured to the seismic imaging module is further configured to warp the geomechanical velocity model" and insert -- wherein the at least one processing device is further caused to warp the geomechanical velocity model --;

Column 20, Lines 31-35 (approx.), Claim 18, delete "generating a second tomographic velocity model based at least partially on the first tomographic velocity model and the geomechanical velocity model, the second tomographic velocity model specifying an updated interval velocity for each of the plurality of subsurface layers based on the primary wave propagation velocity and the secondary wave propagation velocity for each of the plurality of subsurface layers." and insert -- generating a second tomographic velocity model based at least partially on the first tomographic velocity model and the geomechanical velocity model, the second tomographic velocity model being generated based on warping the geomechanical velocity model to the first tomographic velocity model, the second tomographic velocity model configured for generating one or more updated seismic images. --;

Column 20, Line 37, Claim 19, after "generating" insert -- the --;

Column 20, Line 46, Claim 21, delete "Kirchoff" and insert -- Kirchhoff --.